(12) United States Patent
Weigl et al.

(10) Patent No.: US 9,617,995 B2
(45) Date of Patent: Apr. 11, 2017

(54) ROTARY PISTON PUMP WITH SLIP RING SEALS FOR IMPROVED FITTING AND SYNCHRONIZATION OF ROTARY PISTONS

(71) Applicant: NETZSCH Pumpen & Systeme GmbH, Selb (DE)

(72) Inventors: Stefan Weigl, Muehldorf am Inn (DE); Reinhard Denk, Muehldorf (DE); Hisham Kamal, Waldkraiburg (DE); Josef Strassl, Straubing (DE); Robert Kurz, Aschheim (DE); Bernhard Murrenhoff, Buchbach (DE); Thomas Boehme, Waldkraiburg (DE); Gunther Herr, Haarth (DE); Franz Kneidl, Waldkraiburg (DE); Mikael Tekneyan, Waldkraiburg (DE); Matthias Gradl, Sesslach (DE); Erwin Weber, Ampfing (DE); Roger Willis, Mettenheim (DE); Stefan Kern, Haag (DE); Johann Kreidl, Waldkraiburg (DE); Marcel Verhoeven, Hailsham East Sussex (GB); Thomas Schmitt, Toeging am Inn (DE)

(73) Assignee: NETZSCH Pumpen & Systeme GmbH, Selb (DE)

( * ) Notice: Subject to any disclaimer, the term of this patent is extended or adjusted under 35 U.S.C. 154(b) by 132 days.

(21) Appl. No.: 14/453,334

(22) Filed: Aug. 6, 2014

(65) Prior Publication Data

US 2014/0348687 A1    Nov. 27, 2014

Related U.S. Application Data

(63) Continuation of application No. PCT/DE2013/100044, filed on Feb. 7, 2013.

(30) Foreign Application Priority Data

Feb. 17, 2012  (DE) .......................... 102012003067
Feb. 7, 2013   (DE) .......................... 102013101185

(51) Int. Cl.
 *F03C 2/00* (2006.01)
 *F03C 4/00* (2006.01)
 (Continued)

(52) U.S. Cl.
 CPC .......... *F04C 15/0023* (2013.01); *F04C 2/126* (2013.01); *F16J 15/3488* (2013.01);
 (Continued)

(58) Field of Classification Search
 CPC .... F04C 2/18; F04C 2/126; F04C 2/14; F04C 15/0023; F04C 15/0038; F16J 15/3488; F16J 15/34; F16J 15/36
 (Continued)

(56) References Cited

U.S. PATENT DOCUMENTS 4,293,290 A * 10/1981 Swanson ................... F04C 2/18
                                                    418/206.7
5,071,139 A * 12/1991 Warner ................ F16J 15/3488
                                                      277/370
(Continued)

FOREIGN PATENT DOCUMENTS

DE   19806657 A1   9/1999
EP   0577064 A1    1/1994
(Continued)

OTHER PUBLICATIONS

International Search Report Application No. PCT/DE2013/100044 Completed: May 16, 2013; Mailing Date: May 31, 2013 3 pages.

*Primary Examiner* — Theresa Trieu
(74) *Attorney, Agent, or Firm* — Whitmyer IP Group LLC

(57) ABSTRACT

A rotary piston pump with at least two double- or multi-lobe rotary pistons rotating in opposite directions, the drive shafts whereof include seals, wherein the seals are constituted as slip ring seals or lip seals or stuffing-box seals, which in each case are disposed on the shaft shoulder belonging to the respective rotary piston, and one slip ring per seal is provided with a locking device, which includes a large number of fixing positions. The seals are pushed onto a tubular shoulder of the rotary piston, the rotary piston is introduced into the pump housing, the securing element is connected to the slip ring seal in a form-fit manner by rotation of the rotary piston and the shaft shoulder is then rigidly connected to the drive shaft.

13 Claims, 6 Drawing Sheets

(51) Int. Cl.
*F04C 2/00* (2006.01)
*F04C 15/00* (2006.01)
*F04C 2/12* (2006.01)
*F16J 15/36* (2006.01)
*F16J 15/34* (2006.01)

(52) U.S. Cl.
CPC .......... *F04C 15/0038* (2013.01); *F16J 15/34* (2013.01); *F16J 15/36* (2013.01)

(58) Field of Classification Search
USPC .......... 418/104, 102, 206.1–206.7; 277/370, 277/372–376
See application file for complete search history.

(56) References Cited

U.S. PATENT DOCUMENTS

| 5,370,514 | A | * | 12/1994 | Morita | ...................... | F04C 2/18 418/206.1 |
| 5,957,677 | A | * | 9/1999 | Hill | ........................... | F04C 2/18 418/206.1 |
| 6,283,740 | B1 | | 9/2001 | Brown | | |
| 7,427,071 | B2 | * | 9/2008 | Giggenbacher | ...... | F16J 15/3488 277/370 |
| 7,905,717 | B2 | * | 3/2011 | Whittome | ................. | F04C 2/18 418/206.1 |
| 2008/0038138 | A1 | | 2/2008 | Bishop et al. | | |
| 2009/0304540 | A1 | | 12/2009 | Whittome et al. | | |

FOREIGN PATENT DOCUMENTS

| EP | 0799998 A1 | 10/1997 |
| EP | 1329635 A1 | 7/2003 |

* cited by examiner

ROTARY PISTON PUMP WITH SLIP RING SEALS FOR IMPROVED FITTING AND SYNCHRONIZATION OF ROTARY PISTONS

FIELD OF THE INVENTION

The present invention relates to a rotary piston pump with at least two double- or multi-lobe rotary pistons rotating in opposite directions, the drive shafts whereof comprise seals.

BACKGROUND OF THE INVENTION

A rotary piston pump emerges from German Publication 198 06 657, which comprises two drive shafts for the rotation of the rotors. Both drive shafts are provided at their end in the pump space with screw connections, by means of which the rotors are fixed to the drive shafts. Both drive shafts are produced in one piece and remain in the pump housing during the assembly or dismantling of the rotors. In order that the assembly work is facilitated, one of the drive shafts is connected to the drive by means of a coupling and can thus rotate freely with respect to the other drive shaft in the uncoupled state.

Patent specification U.S. Pat. No. 6,283,740 B3 discloses a rotary piston pump with an improved seal, which is mounted between the rotor and the external diameter of the shaft. An adapter is provided for the drive shaft, with which the drive shaft can easily be coupled to a large number of drive mechanisms. The adapter can be replaced by an alternative adapter in order to match alternative drives.

Patent application US 20080038138 A1 discloses a rotary piston pump with a pump body, with a drive unit and with an external housing, wherein the housing is provided with an insert. The insert comprises a housing made of a plastic material and is provided with an inlet opening and an outlet opening. The housing comprises openings through which the rotors can be driven in a rotary manner, so that the rotors engage in one another and thus pump a fluid from the inlet opening to the outlet opening.

SUMMARY OF THE INVENTION

The problem of the present invention compared with the prior art consists in making available a rotary piston pump, wherein the fitting and removal of the rotary pistons and the slip ring seal is optimized.

This problem is solved with regard to the mechanical design of the rotary piston pump with at least two double- or multi-lobe rotary pistons rotating in opposite directions, the drive shafts whereof comprise seals, characterized in that the seals are disposed in each case on a shaft shoulder belonging to the respective rotary piston, wherein each seal is provided with a locking device, which comprises a large number of fixing positions on the housing of the seal.

With regard to the problem to be solved with the invention in terms of the fitting and synchronisation of the rotary pistons, reference is made to the features of the method claim.

Advantageous possible embodiments of the invention are to be found in the dependent claims.

A rotary piston pump with at least two double- or multi-lobe rotary pistons rotating in opposite directions is disclosed, the drive shafts whereof each comprise a seal. The seals are disposed in each case on a shaft shoulder belonging to the respective rotary piston. These shaft shoulders are drilled and/or moulded hollow and are connected fixedly to the respective rotary piston. The seals, which are fitted on the shaft shoulders, are provided with a locking device, wherein each locking device comprises a large number of fixing positions on the housing of the seal.

The locking device according to the invention is a ring, which is connected to the housing of the seal. Furthermore, the locking device comprises a plurality of axial grooves running parallel to the rotary piston axis. These axial grooves extend over the whole periphery of the annular locking device and are disposed at a uniform distance from one another on the annular locking device. It is also possible for the axial grooves to cover only a partial region of the periphery of the annular locking device. A configuration is preferably selected, in which a partial region of 45 degrees is covered twice. By means of this configuration, it is possible for a securing element to engage in each case in one of the two 45 degree regions and to engage here in each case in an axial groove. The axial grooves are chamfered, so that the securing elements can lock home in an ideal manner. Furthermore, more rapid and more reliable locking-home of the securing elements in the axial grooves is enabled by the chamfering.

In a preferred embodiment, the axial grooves are not introduced completely into the locking device, but comprise a web which is intended to space a securing element apart from the seal itself. The rear end face of the locking device forms an axial stop, which creates an active mating with the rear side of the pump housing. As a result of the interaction of the locking device and the rear side of the pump housing, the slip ring seal is subjected to a desired pretensioning.

Furthermore, it is possible to leave the internal diameter of the slip ring seal open, so that the slip ring seal lies freely on the shaft shoulder. In a supplementary embodiment, a lip seal or a second slip ring seal is disposed in the internal diameter of the slip ring seal.

It is clear to the person skilled in the art that there are many possible ways of producing the locking device and/or of fitting it on the slip ring seal. The locking device can be a ring which is fitted on the slip ring seal. In a further embodiment, the locking device, during production of the seal, is at the same time milled out from the seal housing.

At least one securing element is assigned to the axial grooves, wherein the securing element engages in one or more axial grooves. The securing element comprises at least two pins and/or bolts, which engage in the axial grooves. In a preferred embodiment, the securing element comprises an annular element extending around the seal, approximately over 180°. Furthermore, the securing element is connected fixedly and/or in a non-rotatable manner to a part of the housing of the seal.

The seal can be a lip seal, a stuffing-box seal or preferably a slip ring seal. The housing, the seal constituted as a slip ring seal, is connected torsionally stiff to a slip ring of the slip ring seal.

Via a tubular shaft shoulder, each rotary piston is connected by means of a clamping device to its respective drive shaft.

Furthermore, a method for fitting seals in rotary piston pumps is disclosed. Here, the seal is fitted on a tubular shaft shoulder of the rotary piston. The rotary pistons are then introduced into the pump housing. By rotation of the respective rotary piston, the securing element becomes connected in a form-fit manner to the seal, wherein pins and/or bolts engage in a locking device. The tubular shaft shoulder is then connected in a non-rotatable manner to the respective drive shaft. Each rotary piston is thus connected in a friction-locked manner and detachably to the drive shaft by means of its tubular shaft shoulder.

A defined formation of components arises as a result of the previously described arrangement of the seals on the respective shaft shoulder of the rotary pistons. This component formation guarantees that the rotary pistons are always fitted with the correct distance from the housing rear wall of the pump chamber. In the past, this distance was always ensured by measurement and adjustment during the fitting of the rotary pistons. This earlier method required enormous skill on the part of the technician and meant that the rotary pistons had to be repeatedly fitted and removed during assembly.

Examples of embodiment of the invention and its advantages are explained in greater detail below with the aid of the appended figures. The size ratios of the individual elements with respect to one another in the figures do not always correspond to the actual size ratios, since some forms are represented simplified and other forms magnified compared with other elements for the sake of better clarity.

DETAILED DESCRIPTION OF THE INVENTION

Figure 1:
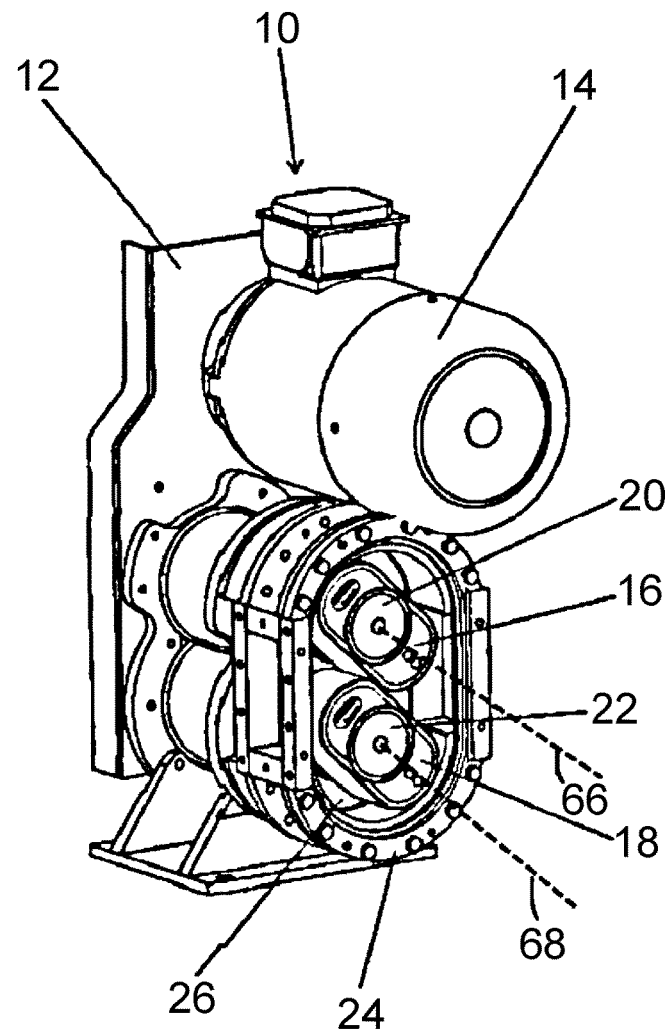
FIG. 1 shows an overall view of a rotary piston pump having first and second rotary pistons.

Rotary piston pump 10, as represented in FIG. 1, essentially comprises a machine stand 12 to which a motor 14 for the drive of first and second rotary pistons 16, 18 is fixed. The first and second rotary pistons 16, 18 extend along respective first and second rotary piston axes 66, 68, and are connected for example, as emerges here from the prior art, to first and second drive shafts 20, 22 and rotate in the represented formation simultaneously and in opposite directions about the axes of first and second drive shafts 20, 22. During rotation of the first and second rotary pistons 16, 18, the first and second rotary pistons 16, 18 make contact with pump housing 24 and thus form constantly recurring pump chambers 26, which suck in the product to be pumped and eject it on the opposite side of the pump. The application of seals, which seal off the surroundings with respect to the pump space, cannot be seen, but is necessary.

Figure 2A:
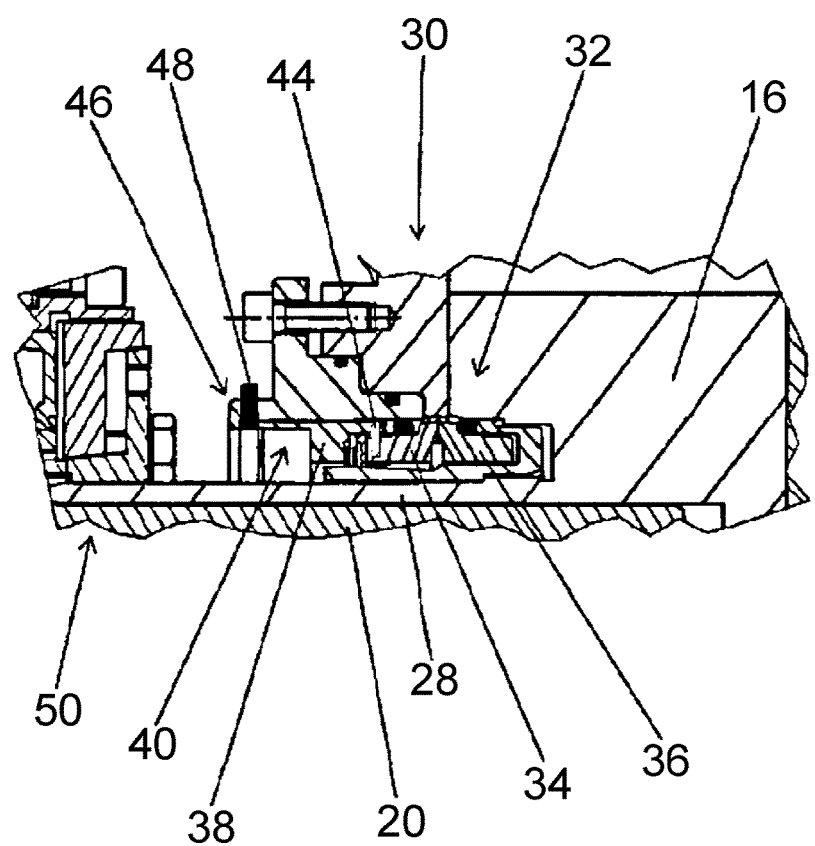
FIG. 2A shows a partial view of a first slip ring seal with the first rotary piston and a first clamping device.
Figure 2B:
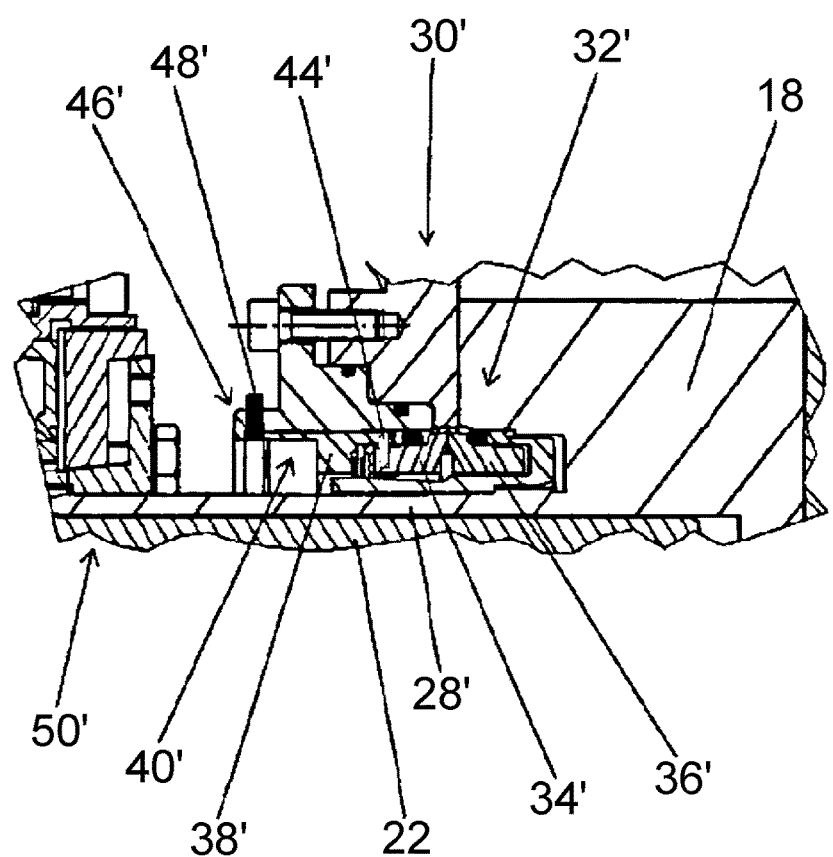
FIG. 2B shows a partial view of a second slip ring seal with the second rotary piston and a second clamping device.

FIG. 2A shows a part of the first rotary piston 16 with a first tubular shaft shoulder 28. First accommodation housing 30 for first slip ring seal 32 follows on from first rotary piston 16 on the left. First slip ring seal 32 comprises first housing 38, two first slip rings 34, 36 and the respective O-rings, which seal off the interior space of first slip ring seal 32 from first accommodation housing 30 of first slip ring seal 32. First housing 38 of first slip ring seal 32, which can also be first housing 38 of a lip seal or stuffing-box seal, extends beyond the actual sealing region in the opposite direction to first rotary piston 16. This extended region of first housing 38 forms first locking device 40, which comprises a large number of fixing positions or first axial grooves 42 (see FIG. 3). The part of first housing 38 of first slip ring seal 32 that is located outside first rotary piston 16 is connected in a torsionally stiff manner by means of a first pin or bolt 44 to left-hand first slip ring 34. FIG. 2B shows a part of the second rotary piston 18 with a second tubular shaft shoulder 28'. Second accommodation housing 30' for second slip ring seal 32' follows on from second rotary piston 18 on the left. Second slip ring seal 32' comprises second housing 38', two second slip rings 34', 36' and the respective O-rings, which seal off the interior space of second slip ring seal 32' from second accommodation housing 30' of second slip ring seal 32'. Second housing 38' of second slip ring seal 32', which can also be second housing 38' of a lip seal or stuffing-box seal, extends beyond the actual sealing region in the opposite direction to second rotary piston 18. This extended region of second housing 38' forms second locking device 40', which comprises a large number of fixing positions or second axial grooves 42'. The part of second housing 38' of second slip ring seal 32' that is located outside second rotary piston 18 is connected in a torsionally stiff manner by means of a second pin or bolt 44' to left-hand second slip ring 34'.

Referring to FIG. 2A, located in first accommodation housing 30 for first slip ring seal 32 at the outermost end is a first recess 46, in which first securing element 48 engages. First securing element 48 extends radially beyond first recess 46 into first axial grooves 42 in first housing 38 of first slip ring seal 32. It can also be seen here how first securing element 48 engages in first locking device 40. The connection between first accommodation housing 30 and the pump housing (not represented) takes place by means of screws. Referring to FIG. 2B, located in second accommodation housing 30' for second slip ring seal 32' at the outermost end is a second recess 46', in which second securing element 48' engages. Second securing element 48' extends radially beyond second recess 46' into second axial grooves 42' in second housing 38' of second slip ring seal 32'. It can also be seen here how second securing element 48 engages in second locking device 40'. The connection between second accommodation housing 30' and the pump housing (not represented) takes place by means of screws.

Referring to FIG. 2A, first shoulder 28 is fixedly connected to first rotary piston 16 and accommodates a first clamping device 50 at its side adjacent to first slip ring seal 30. First clamping device 50 also connects first rotary piston 16 to first drive shaft 20. First clamping device 50 operates mechanically by means of components with conical faces and, when screws are operated, leads to a reduction of the internal cross-section of the annular components engaging into one another. Referring to FIG. 2B, second shoulder 28' is fixedly connected to second rotary piston 18 and accommodates a second clamping device 50' at its side adjacent to second slip ring seal 30'. Second clamping device 50' also connects second rotary piston 18 to second drive shaft 22. Second clamping device 50' operates mechanically by means of components with conical faces and, when screws are operated, leads to a reduction of the internal cross-section of the annular components engaging into one another.

Figure 3:
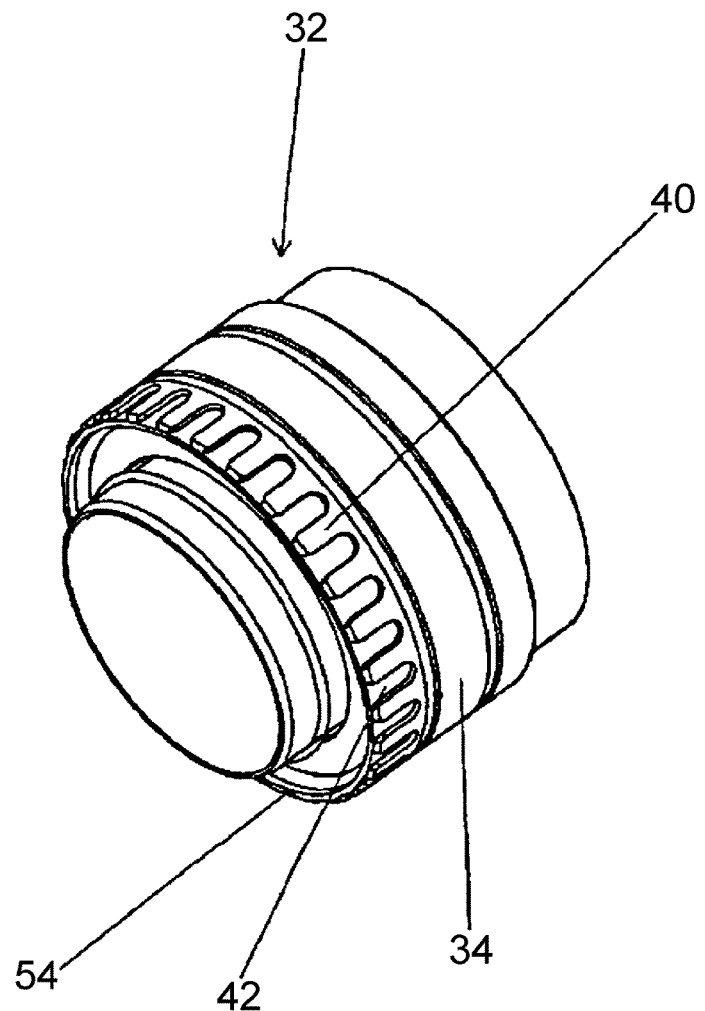
FIG. 3 shows the first slip ring seal with first axial grooves.

The invention does not relate to the internal components of first and second seals/slip ring seals 32, 32' or possible seal variants according to the invention, but to their parts visible to the exterior. In particular, it concerns first and second locking devices 40, 40'. First locking device 40 is represented in FIG. 3, which comprises a first outer ring 54, which is fitted laterally to first slip ring seal 32. This first outer ring 54 comprises axial grooves, which are disposed at identical distances from one another and which have a free open end in order that the securing element (not represented) can engage with its pins/bolts into first axial grooves 42 when the first rotary piston 16 is introduced into the pump housing. This engagement brings about the immobilization of first slip ring 34 and thus ensures the desired sealing of the pump chamber. Although first housing 38 of first slip ring seal 32 is described for the function of first slip ring seal 32 in this example of embodiment, first housing 38 can also accommodate in its interior a seal in the form of a stuffing-box seal or a lip seal. In these examples of embodiment, the securing element secures the overall sealing package and seals off the first tubular shaft shoulder 28 and the pump chamber.

Figure 4:
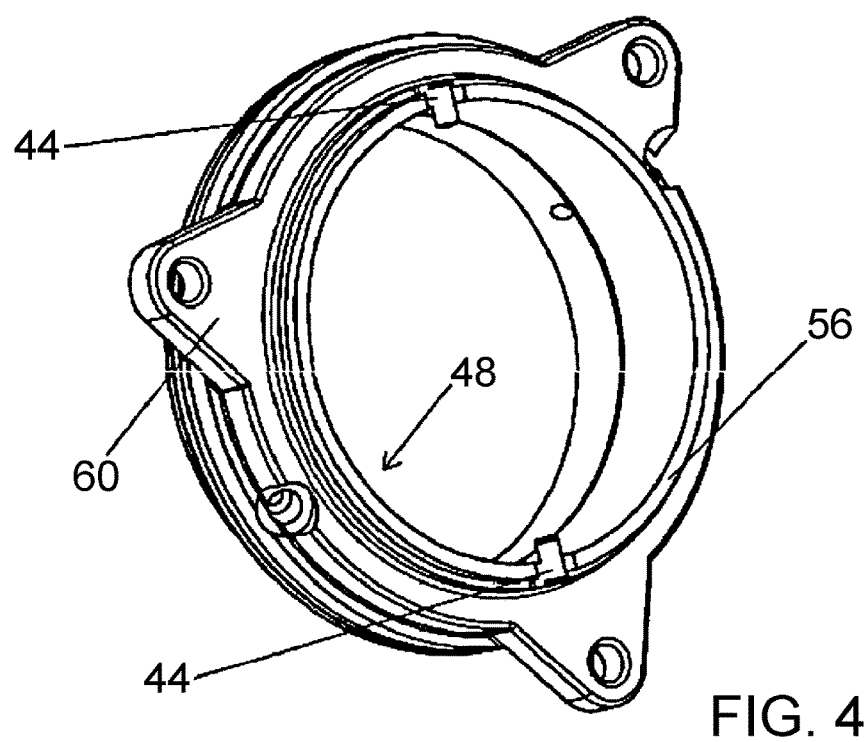
FIGS. 4 and 5 show possible embodiments of the first securing elements and the first accommodation housing.
Figure 5:
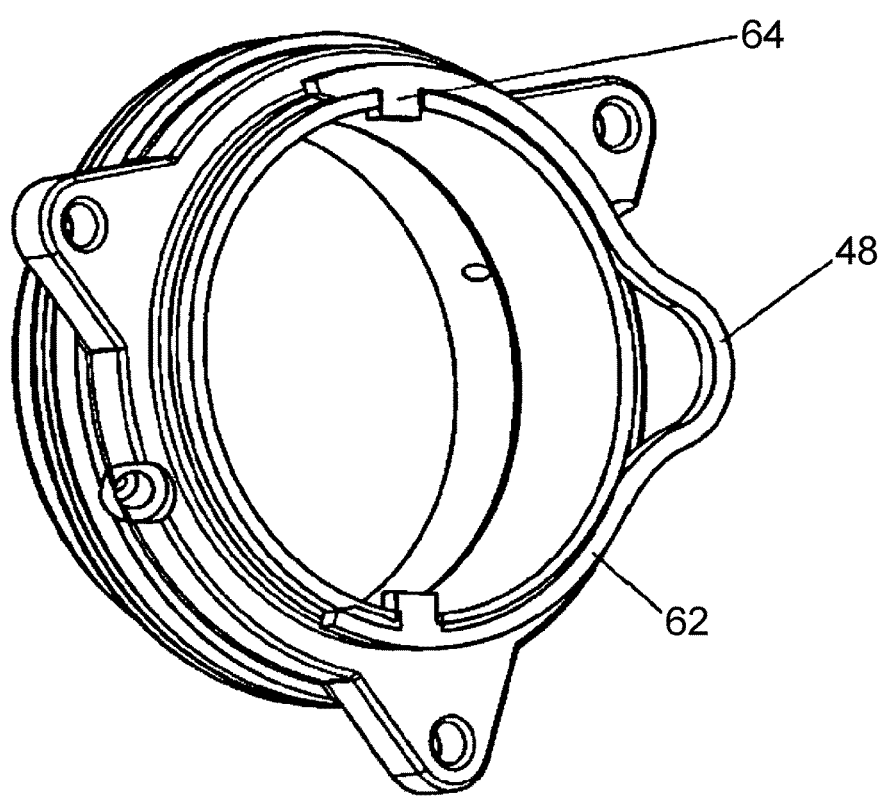

The two FIGS. 4 and 5 show different embodiments of first securing element 48. This first securing element 48 can be seen from FIG. 4 as an annular element 56, which sits in first accommodation housing 30 of the first slip ring seal 32. Annular element 56 comprises first pins or bolts 44, which engaged in the housing of the first slip ring seal 32. This engagement leads to the immobilization of the first slip ring 34. The components of the first accommodation housing 30 are connected to one another via the holes in shoulders 60. In a further embodiment, it is possible to press first pins or bolts 44 into holes (not represented) of first accommodation housing 30 provided for the purpose.

The function of the embodiment of first securing element 48 represented in FIG. 5 is identical to that in FIG. 4. The difference lies solely in the design of the elements that lead to the immobilization of the first slip ring 34. Block-shaped elements 64 are represented here, wherein it can also be wedges or identically acting embodiments. The first securing element 48 has here the shape of a semicircular clasp 62, which by its spring force also provides for a more secure hold to the first accommodation housing 30.

The invention has been described by reference to a preferred embodiment. It is however conceivable for the person skilled in the art that modifications or changes to the invention can be made without departing from the scope of protection of the following claims.

What is claimed is:

1. A rotary piston pump, comprising:
    at least two double- or multi-lobe rotary pistons rotatable in opposite directions, drive shafts whereof having respective seals disposed in each case on a shaft shoulder of the respective rotary piston, wherein each seal is provided with a housing and a locking device, the locking device is a ring that is configured to be connected to the housing of the seal, and the ring includes a plurality of axial grooves running parallel to an axis of the respective rotary piston.

2. The rotary piston pump of claim 1, wherein the plurality of axial grooves extend over an entire periphery of the locking device.

3. The rotary piston pump of claim 2, wherein the plurality of axial grooves are disposed at a uniform distance from one another on the locking device.

4. The rotary piston pump of claim 1, wherein there is assigned to the plurality of axial grooves a securing element, which engages in one or more of the plurality of axial grooves.

5. The rotary piston pump of claim 4, wherein the securing element includes at least two pins or bolts which engage in the plurality of axial grooves.

6. The rotary piston pump of claim 4, wherein the securing element includes an annular element extending around the seal approximately over 180°.

7. The rotary piston pump of claim 4, wherein the securing element is fixedly connected to a part of the housing of the seal.

8. The rotary piston pump of claim 1, wherein the seal is a slip ring seal.

9. The rotary piston pump of claim 8, wherein the housing of the seal is connected torsionally stiff to a slip ring.

10. The rotary piston pump of claim 1, wherein a tubular shaft shoulder and the drive shaft of the respective rotary piston are connected by a clamp.

11. A method for fitting seals in rotary piston pumps, comprising:
    mounting a seal on a tubular shaft shoulder of a rotary piston;
    introducing the rotary piston into a pump housing;
    connecting a securing element in a form-fit manner to the seal by rotating the rotary piston, wherein one or more pins or bolts engage in a locking device; and
    connecting the tubular shaft shoulder in a non-rotatable manner to a drive shaft.

12. The method of claim 11, wherein the rotary piston is connected with the tubular shaft shoulder in a friction-locked or form-fit manner, and is detachably connected to the drive shaft.

13. A rotary piston pump, comprising:
    a first rotary piston extending along a first rotary piston axis, the first rotary piston having at least two lobes and a first shaft shoulder;
    a first drive shaft connected to the first rotary piston;
    a first seal disposed on the first shaft shoulder, the first seal including a first housing and a first locking device, the first locking device including a first ring with a plurality of axial grooves running parallel to the first rotary piston axis, the plurality of axial grooves configured to permit connection of the first ring to the first housing;
    a second rotary piston extending along a second rotary piston axis, the second rotary piston having at least two lobes and a second shaft shoulder;
    a second drive shaft connected to the second rotary piston; and
    a second seal disposed on the second shaft shoulder, the second seal including a second housing and a second locking device, the second locking device including a second ring with a plurality of axial grooves running parallel to the second rotary piston axis, the plurality of axial grooves configured to permit connection of the second ring to the second housing;
    wherein the first rotary piston and the second rotary piston are rotatable in opposite directions relative to one another.

* * * * *